United States Patent
Nishijima (10) Patent No.: US 9,203,294 B2
(45) Date of Patent: Dec. 1, 2015

(54) SWITCHING POWER SUPPLY WITH FUNDAMENTAL FREQUENCY CONTROL

(71) Applicant: FUJI ELECTRIC CO., LTD., Kawasaki-shi (JP)

(72) Inventor: Kenichi Nishijima, Matsumoto (JP)

(73) Assignee: FUJI ELECTRIC CO., LTD., Kawasaki-Shi (JP)

( * ) Notice: Subject to any disclaimer, the term of this patent is extended or adjusted under 35 U.S.C. 154(b) by 21 days.

(21) Appl. No.: 13/961,992

(22) Filed: Aug. 8, 2013

(65) Prior Publication Data

US 2014/0078784 A1    Mar. 20, 2014

(30) Foreign Application Priority Data

Sep. 20, 2012 (JP) ................. 2012-207647

(51) Int. Cl.
*H02M 1/12* (2006.01)
*H02M 1/44* (2007.01)
*H02M 3/335* (2006.01)
*H02M 1/00* (2007.01)

(52) U.S. Cl.
CPC *H02M 1/12* (2013.01); *H02M 1/44* (2013.01); *H02M 3/33523* (2013.01); *H02M 2001/0032* (2013.01); *Y02B 70/16* (2013.01)

(58) Field of Classification Search
CPC ..... H02M 1/12; H02M 3/156; H02M 7/5395; H02M 2001/0003; H02M 2001/0032; H02M 3/33523; H02M 1/44
USPC .................................. 323/284; 363/39, 40, 41
See application file for complete search history.

(56) References Cited

U.S. PATENT DOCUMENTS

| | | | | |
|---|---|---|---|---|
| 5,818,703 A * | 10/1998 | Jacobson | .................... | 363/21.13 |
| 7,499,290 B1 * | 3/2009 | Mazzola et al. | ................ | 363/17 |
| 7,701,735 B2 * | 4/2010 | Park et al. | .................. | 363/21.16 |
| 7,817,391 B2 * | 10/2010 | Kimber | .................... | H02M 1/32 323/282 |
| 2009/0141526 A1 * | 6/2009 | Jiang | ....................... | H02M 1/44 363/157 |
| 2014/0126246 A1 * | 5/2014 | Djenguerian | ..... | H02M 3/33515 363/21.13 |
| 2014/0204640 A1 * | 7/2014 | Sutardja | .................... | G05F 1/70 363/89 |

FOREIGN PATENT DOCUMENTS

JP   2008-005682 A     1/2008
JP   2008005682 A *    1/2008

* cited by examiner

*Primary Examiner* — Jue Zhang
*Assistant Examiner* — Lakaisha Jackson
(74) *Attorney, Agent, or Firm* — Rabin & Berdo, P.C.

(57) ABSTRACT

A switching power supply can reduce conduction noise when frequency spread control is conducted simultaneously with switching frequency reducing control. The switching power supply includes a frequency controller that controls the switching frequency of the switching element corresponding to a load condition and reduces the switching frequency in a light load period, a frequency spread modulator that modulates the switching frequency with a predetermined frequency spread width, and a frequency skipping controller that controls the frequency controller to skip a fundamental frequency of the switching frequency when the fundamental frequency becomes a predetermined threshold frequency.

5 Claims, 10 Drawing Sheets

FIG. 7B
RELATED ART fs:44(kHz), n=4, EMI margin ;−9(dB μ V)

FIG. 9 RELATED ART

SWITCHING POWER SUPPLY WITH FUNDAMENTAL FREQUENCY CONTROL

CROSS-REFERENCE TO RELATED APPLICATION

This application is based on, and claims priority to, Japanese Patent Application No. 2012-207647, filed on Sep. 20, 2012, contents of which are incorporated herein by reference.

BACKGROUND OF THE INVENTION

1. Field of the Invention

The present invention relates to a switching power supply that generates reduced conduction noise in switching process of a switching element.

2. Description of the Related Art

Figure 5:
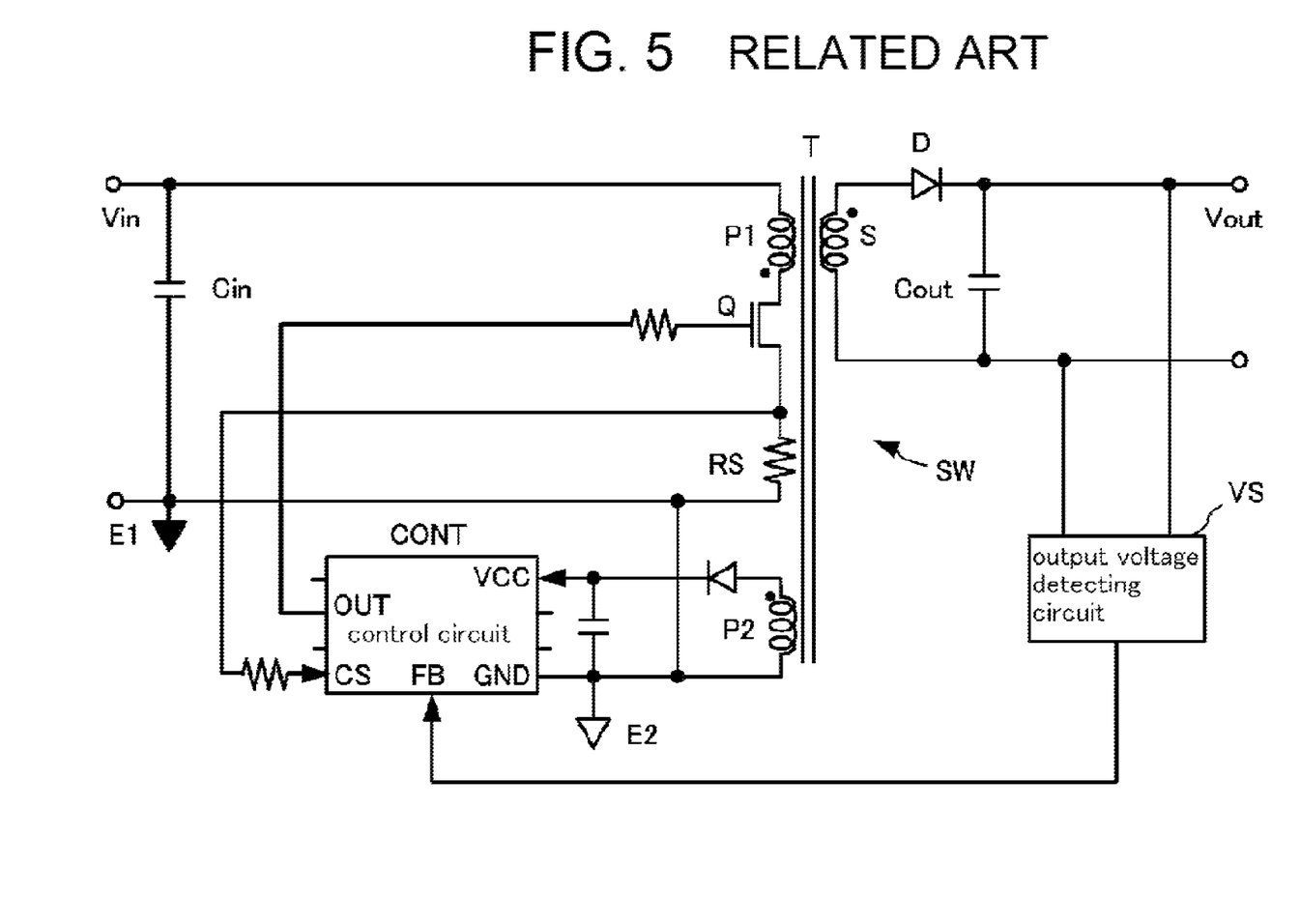
FIG. 5 shows an example of schematic construction of a switching power supply.

A switching power supply is basically composed, as shown in FIG. 5, of a main body SW of the switching power supply and a control circuit CONT. The main body SW conducts switching an input voltage Vin by a switching element Q and delivers a specified output voltage Vout through an isolation transformer T. The control circuit CONT, which is a control IC, ON/OFF-drives the switching element Q at a predetermined frequency. The switching element, which can be a MOS-FET or an IGBT, is connected to a primary winding P1 of the isolation transformer T and conducts switching the input voltage Vin. With the switching of the switching element Q, an alternating voltage is generated on a secondary winding S of the isolation transformer T. The AC voltage is rectified by a diode D and smoothed by an output capacitor Cout to deliver an output voltage Vout. The symbol Cin in the figure designates an input capacitor.

The control circuit CONT works with a driving power source of the winding voltage developed across an auxiliary winding P2 of the isolation transformer T. The control circuit CONT controls the switching of the switching element Q corresponding to the feedback information from an output voltage detecting circuit VS that detects the output voltage Vout. The switching control is performed, for example, by PWM control that changes the ON width of the switching element Q that is driven at a constant frequency, that is, at a constant period, corresponding to the feedback information. The control circuit CONT is also provided with a protection circuit (not shown in the figure) that detects an overcurrent flowing through the switching element Q via a shunt resistor RS series-connected to the switching element Q and protects the switching element Q from overcurrent.

The switching power supply having the above-described construction inevitably generates conduction noise of higher harmonics caused by the switching operation of the switching element Q. In order to reduce the conduction noise, Patent Document 1 (identified below), for example, discloses modulating the switching frequency fs of ON/OFF driving the switching element Q with a predetermined spread width ±Δf.

Figure 6:
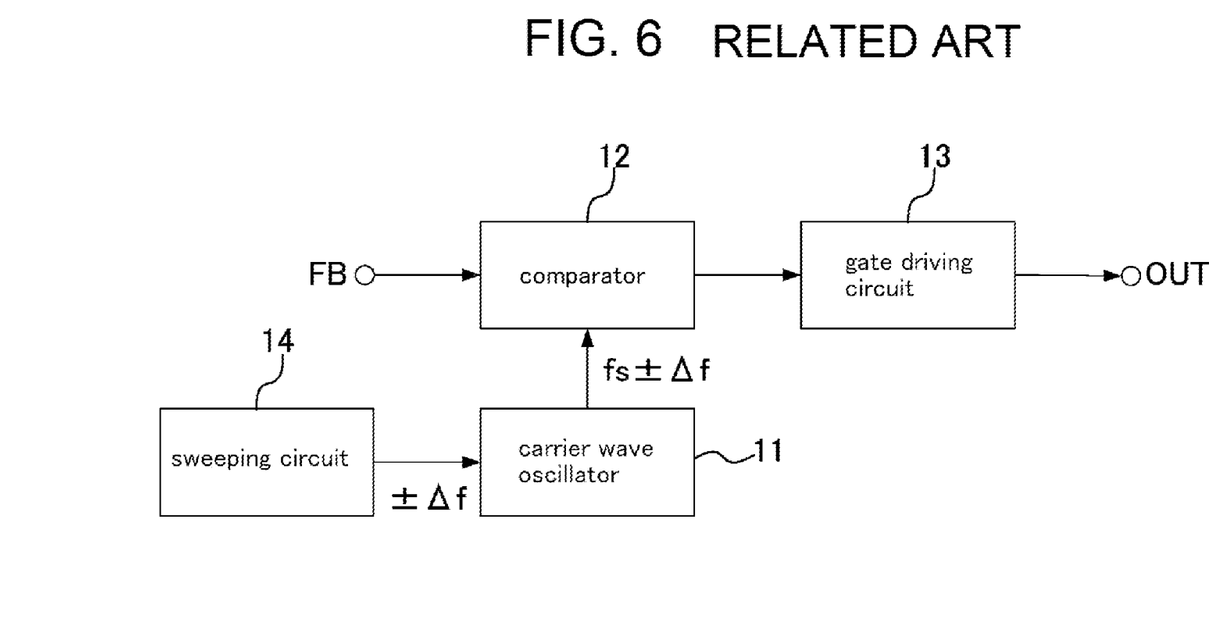
FIG. 6 an example of a circuit for spread control of the switching frequency fs in a control circuit of a switching power supply.

The spread control (or jitter control) of the switching frequency fs is conducted as shown in FIG. 6 in the control circuit CONT by a comparator 12 that compares a carrier wave of a triangular wave at a specified frequency fs generated by a carrier wave oscillator 11 with the feedback information FB from the output voltage detecting circuit VS and generates a signal for regulating the ON width of the switching element Q. The comparator 12 delivers an output signal for ON/OFF driving the switching element Q through a gate driving circuit 13, thereby performing ON width control of the switching element Q under the condition of the specified frequency fs.

The spread control (or jitter control) of the switching frequency fs is conducted using a sweep circuit 14 that generates a frequency control signal of a triangular waveform, for example, for a frequency spread width of ±Δf and gives the generated frequency control signal to the carrier wave oscillator 11 to modulate the frequency fs of the carrier wave within the range of the frequency spread width ±Δf. As a consequence, the frequency of the carrier wave is given to the comparator 12 after modulation to fs ±Δf. Thus, the switching frequency fs of the switching element Q is modulated with a frequency spread width of ±Δf.

Such spread control (or jitter control) of the switching frequency fs can reduce the conduction noise caused by switching of the switching element Q by about 10 dB on average in a frequency band of from 150 kHz to 1 MHz, for example.

Patent Document 1

Japanese Unexamined Patent Application Publication No. 2008-005682

In a switching power supply, the switching frequency fs is reduced under a light load condition to prevent power efficiency from decreasing in the light load period. In a case in which the control of reducing the switching frequency fs is executed simultaneously with the frequency spread control (or jitter control), conduction noise above 150 kHz are as shown in FIG. 7A and FIG. 7B for a load Po of 75% and a load Po of 65%, respectively.

Figure 7A:
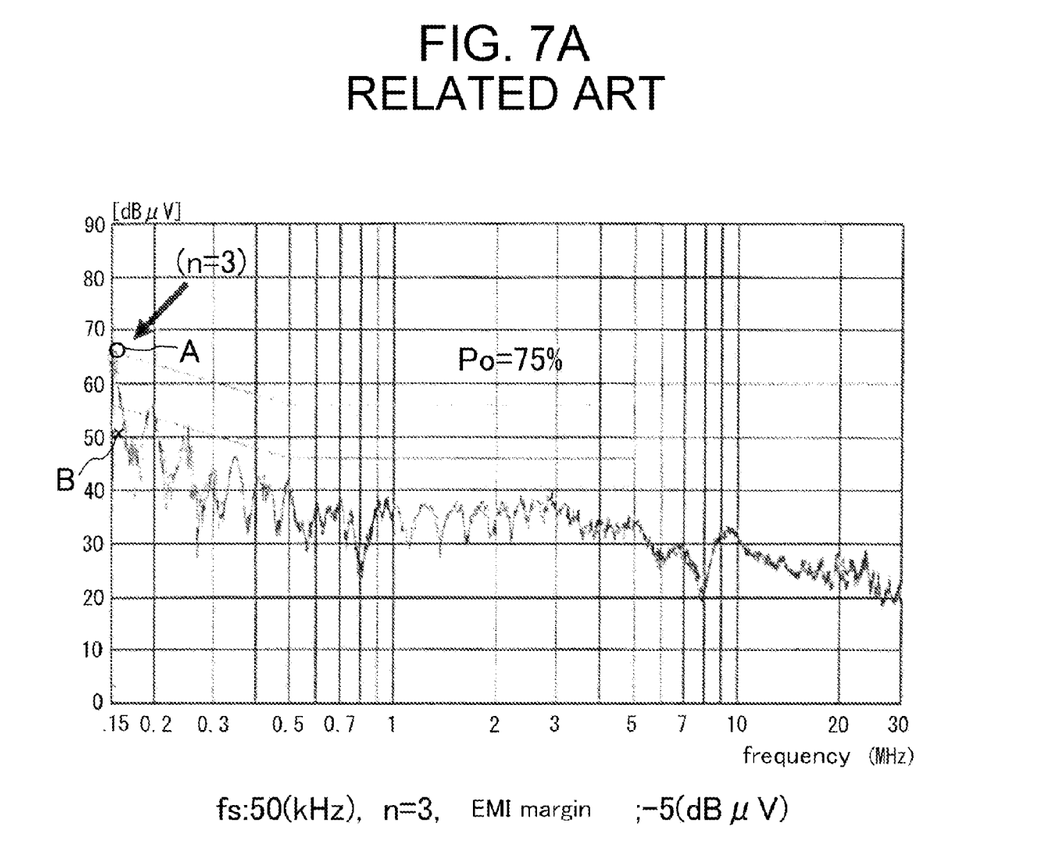
FIGS. 7A and 7B show examples of conduction noise at switching frequencies fs of 50 kHz and 44 kHz, respectively.

Specifically, FIG. 7A shows the conduction noise where the load Po is decreased to 75% and reducing control of the switching frequency fs to 50 kHz is conducted in a switching power supply that performs switching operation at a switching frequency fs of 65 kHz under a load Po of 100%. A noise margin of −5 dB μV on average is shown. FIG. 7B shows the conduction noise when the load Po is decreased to 65% and reducing control of the switching frequency fs to 44 kHz is conducted, showing a noise margin of −9 dB μV on average. In FIGS. 7A and 7B, the mark ○ indicated by the symbol A represents the peak value of the conduction noise and the mark x indicated by the symbol B represents the average value of the conduction noise.

Figure 7B:
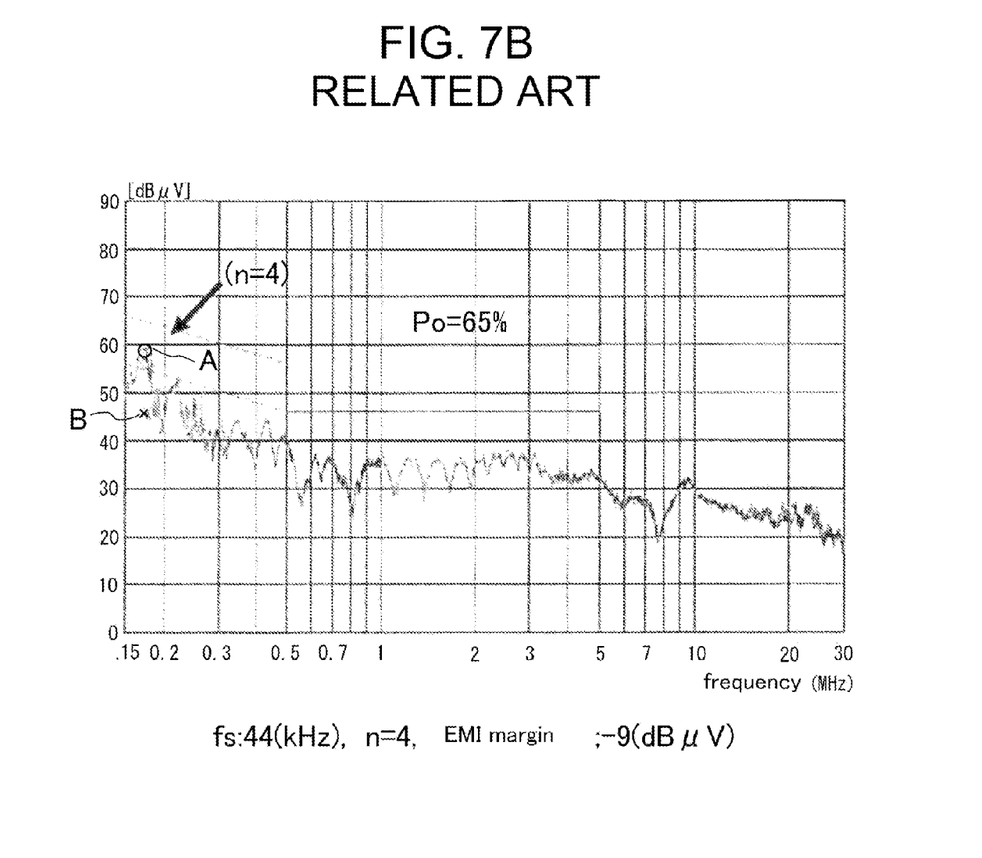

Concerning the relationship between the frequency of the conduction noise and the order n of harmonics of the switching frequency fs, in the case of a switching frequency fs of 50 kHz as in FIG. 7A, large conduction noise at around 150 kHz occurs in harmonics of the order n of three; and in the case of a switching frequency fs of 44 kHz as in FIG. 7B, large conduction noise at around 150 kHz occurs in harmonics of the order n of four. In other words, the order n of harmonics that generate the conduction noise around 150 kHz changes from three to four at a switching frequency fs of about 50 kHz.

Figure 8:
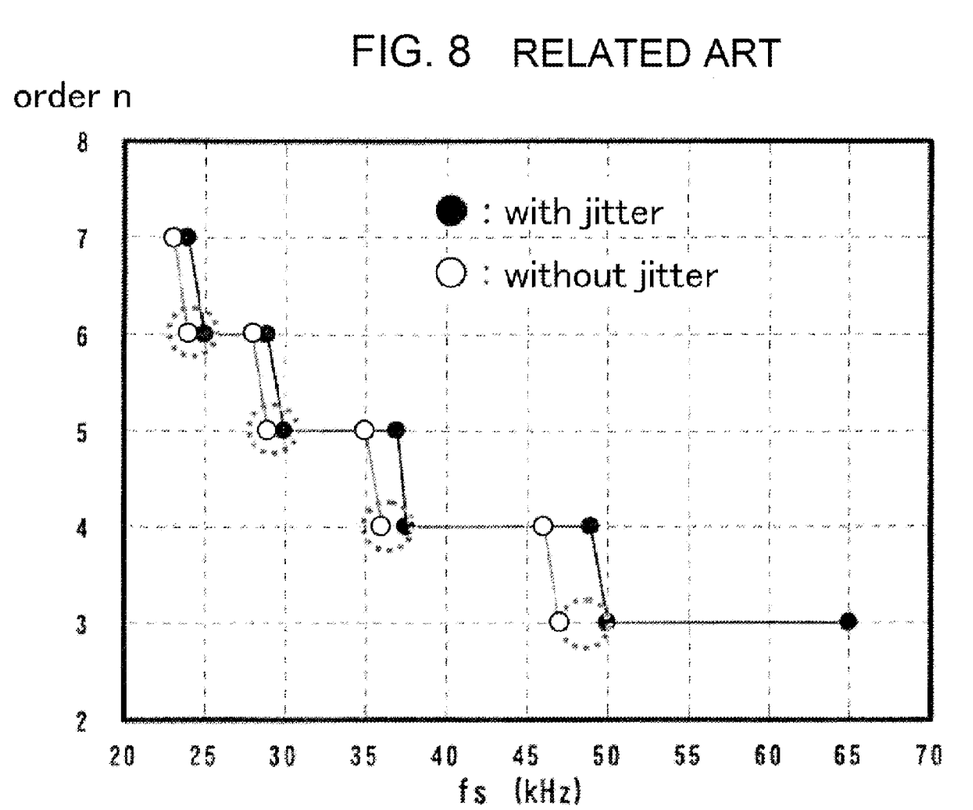
FIG. 8 shows the order n of harmonics that generate conduction noise of harmonics at around 150 kHz as a function of a switching frequency fs in the cases with and without the frequency spread control.

When the frequency spread control (or jitter control) is conducted in addition to the reducing control of the switching frequency fs, as shown by the mark o in FIG. 8, the frequency at which the order n of harmonics changes shifts to a lower frequency as compared with the case indicated by the mark • in FIG. 8, in which the frequency spread control (or jitter control) is not conducted but solely the reducing control of the switching frequency fs is conducted.

In the case without the frequency spread control (or jitter control) and the switching frequency fs of 48 kHz, the order n of harmonics that causes generation of conduction noise at 150 kHz or higher is four because 48 kHz×3=144 kHz<150 kHz. On the other hand, in the case the frequency spread control (or jitter control) is conducted and the frequency spread width Δf is 7% of the switching frequency, which equals 3.36 kHz, (48 ±3.36) kHz×3=133.92–154.08 kHz>150 kHz. Consequently, the harmonics of the order three with a higher level than the order four appears in the conduction noise above 150 kHz.

This means that the conduction noise at around 150 kHz in the case of the frequency spread control (or jitter control) is the noise component of the order of three of harmonics of the switching frequency fs, and is larger than the noise component of the order of four of harmonics in the case without the frequency spread control (or jitter control). In other words, when the frequency spread control (or jitter control) is conducted and the switching frequency fs is reduced to 50 kHz, the effect of conduction noise reduction cannot be expected. As shown in FIG. 8, this problem arises with the reducing control of switching frequency fs at frequencies of around 38 kHz, 30 kHz, and 25 kHz as well as around 50 kHz.

Figure 9:
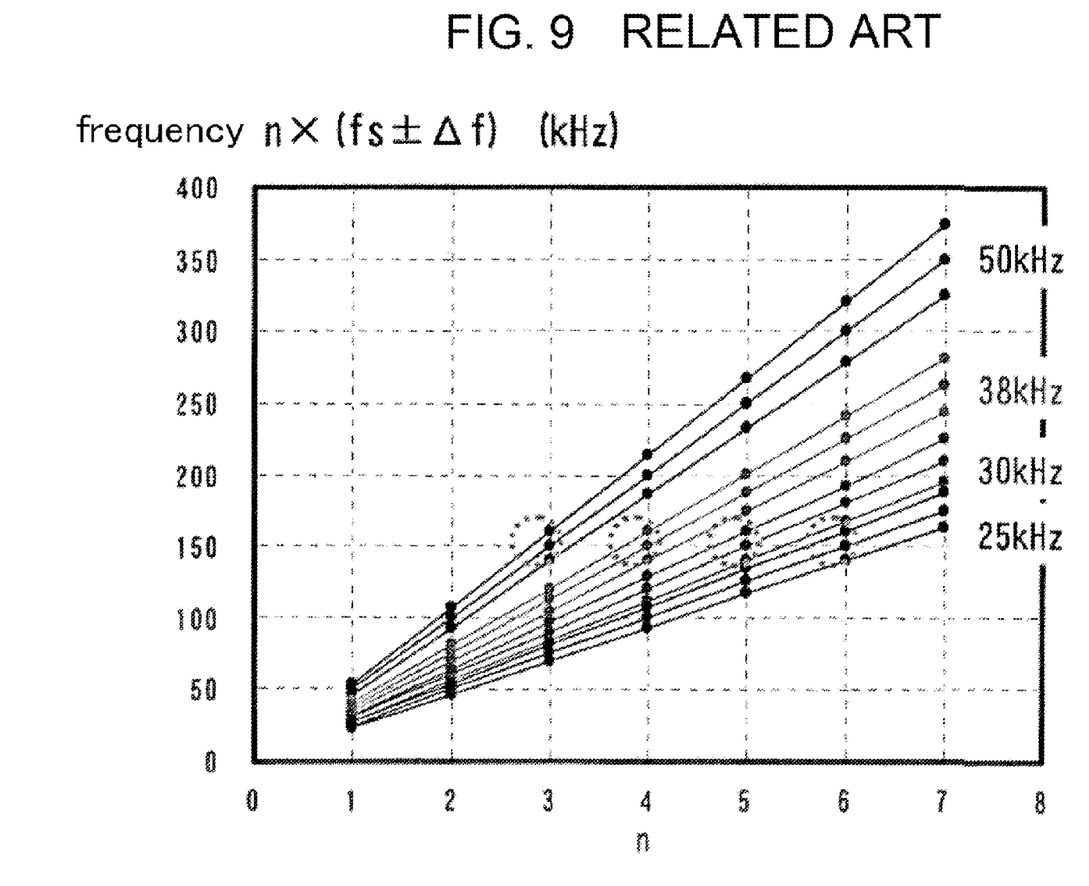
FIG. 9 shows the frequencies of conduction noise corresponding to an order n of harmonics at the switching frequencies fs of 50 kHz, 38 kHz, 30 kHz, and 25 kHz including a frequency spread width Δf.

FIG. 9 shows the frequencies of conduction noise corresponding to the order n of harmonics with parameters of a switching frequency fs including the frequency spread width Δf. As can be seen in FIG. 9, there are orders n of harmonics that change the frequency of conduction noise due to the frequency spread between above and below 150 kHz at some reducing of controlled switching frequencies. The noise component of such orders n of harmonics causes enlarged conduction noise at around 150 kHz. Consequently, if generation of harmonics is controlled at least not to cause conduction noise at the frequencies that changes between just above and below 150 kHz, the conduction noise in the frequency band over about 150 kHz can be stably reduced.

SUMMARY OF THE INVENTION

The present invention has been made in view of this circumstance and an object of the present invention is to provide a switching power supply that avoids generation of conduction noise of harmonics with frequencies that change between above and below 150 kHz in executing reducing control of the switching frequency fs under a light load condition and carrying out frequency spread control (or jitter control), thereby reducing the conduction noise.

In order to achieve the above object, a switching power supply of the present invention comprises a main body of the switching power supply that switches an input voltage by a switching element and delivers a specified output voltage, a control circuit that ON/OFF-drives the switching element at a predetermined frequency fs, a frequency controller that controls the switching frequency fs of the switching element corresponding to a load condition of the main body of the switching power supply and reduces the switching frequency fs in a light load period, a frequency spread modulator that modulates the switching frequency fs with a frequency spread width ±Δf corresponding to the switching frequency fs, and a frequency skipping controller that controls the frequency controller to skip a fundamental frequency of the switching frequency fs when the fundamental frequency becomes a predetermined threshold frequency fth.

The frequency skipping controller may control skipping of the fundamental frequency with the threshold frequency fth that is the fundamental frequency of the switching frequency fs at which an order n of harmonics at a specified frequency, around 150 kHz, for example, changes in conduction noise generated due to switching of the switching element.

The frequency skipping controller may detect the switching frequency fs of the switching element from the change of current through the switching element and compare the fundamental frequency of the switching frequency fs with the threshold frequency fth to control skipping of the fundamental frequency.

The threshold frequencies fth may be preliminarily set for fundamental frequencies of the switching frequency, 50 kHz, 38 kHz, 30 kHz, and 25 kHz, for example, at which a frequency of conduction noise of harmonics generated corresponding to the frequency-modulated switching frequency changes between above and below 150 kHz.

The switching power supply having a construction as stated above does not generate conduction noise that changes the frequency between just above and below 150 kHz even when conducting frequency spread control (or jitter control) simultaneously with reducing control of the switching frequency fs in a light load period. Thus, the conduction noise is stably reduced in the frequency band above 150 kHz. In particular, the control circuit of the power supply of the invention controls the frequency control means to skip the fundamental frequency and controls so that the frequency of the conduction noise becomes a harmonic of higher order when the fundamental frequency of the switching frequency fs becomes a predetermined threshold frequency at which point the order n of the harmonics changes. Consequently, conduction noise is effectively reduced in a simple way while taking advantage of the frequency spread control (or jitter control).

Therefore, the present invention provides a practically useful switching power supply that generates reduced conduction noise as well as improved power efficiency owing to reducing control of switching frequency fs in a light load period.

DETAILED DESCRIPTION OF THE INVENTION

The following describes a switching power supply according to an embodiment of the present invention with reference to accompanying drawings.

A switching power supply of this embodiment has basically a construction similar to that of the conventional power supply shown in FIG. 5. Thus, the description here omits specific explanation about the main body SW of the switching power supply that performs switching the input voltage Vin through the switching element Q to obtain a specified output voltage Vout and about the control circuit CONT, which is a control IC, that performs ON/OFF driving the switching element Q at a predetermined frequency.

The control circuit CONT in the switching power supply comprises a frequency controller and a frequency spread modulator. The frequency controller controls a fundamental frequency regulating a switching frequency fs of the semiconductor element Q corresponding to a load condition on the main body SW of the switching power supply and reduces the fundamental frequency of the switching frequency fs under a light load condition. The frequency spread modulator modulates the fundamental frequency with a specified frequency spread width $\pm\Delta f$ corresponding to the fundamental frequency. The frequency controller and the frequency spread modulator are control technologies known in the art, which are disclosed in Patent Document 1 and are also installed in some switching power supplies.

The control circuit CONT in the invention features the provision of a frequency skipping controller in addition to the frequency controller and the frequency spread modulator. The frequency skipping controller skips the fundamental frequency of a switching frequency fs that is reducing-controlled (e.g., the switching frequency is fs is controlled so as to be reduced) in a light load period under control of the frequency controller. The frequency skipping controller controls the frequency controller to skip the fundamental frequency of a switching frequency fs when the fundamental frequency of the switching frequency fs modulated with a spread width $\pm\Delta f$ has reached a predetermined threshold frequency fth.

Figure 1:
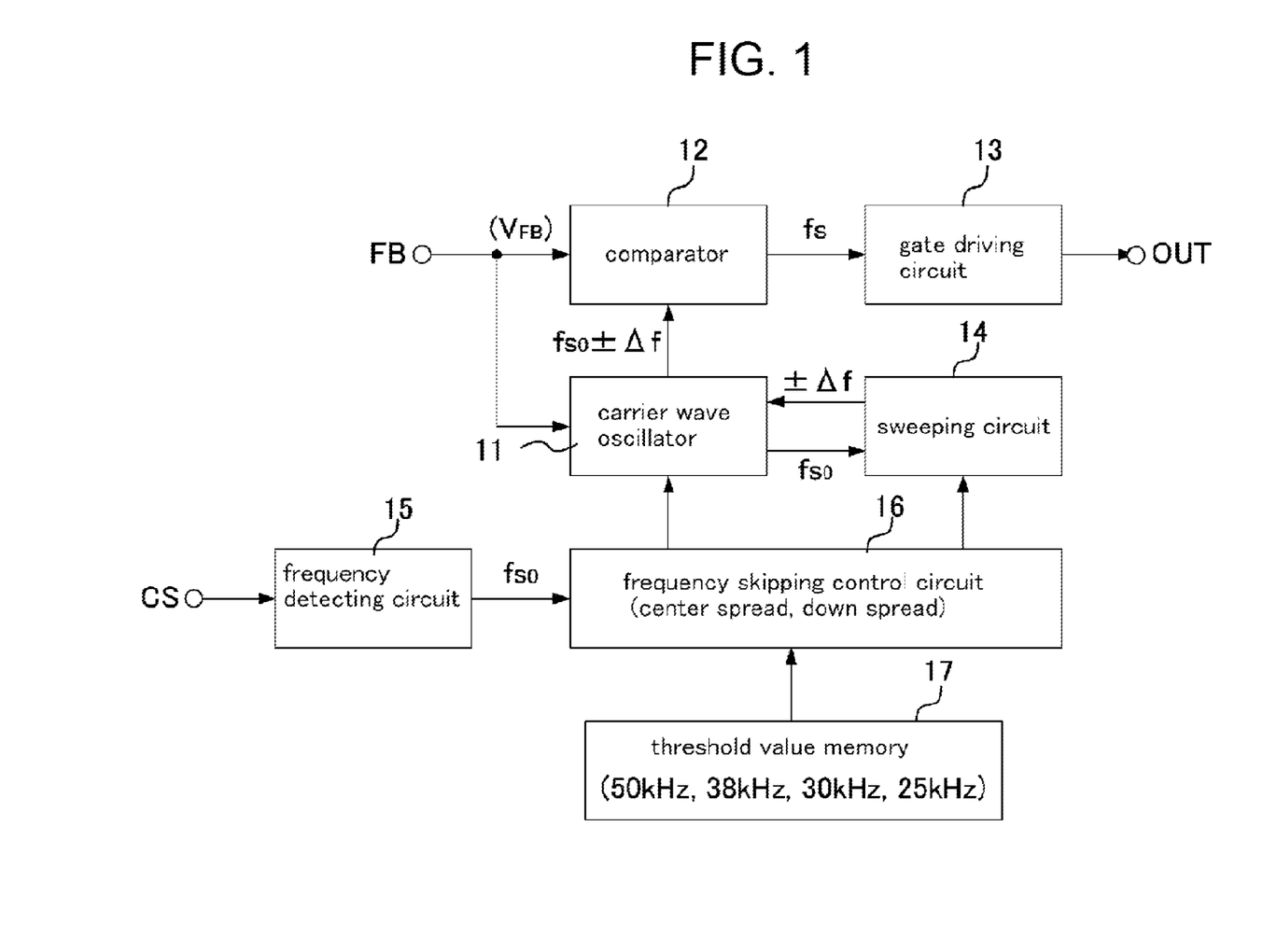
FIG. 1 shows a schematic construction of a part of a control circuit in a switching power supply according to an embodiment of the present invention.

FIG. 1 shows a schematic construction of a part of the control circuit CONT provided with the frequency skipping controller in addition to the frequency controller and the frequency spreading modulator.

The control circuit CONT comprises a comparator 12 that compares a carrier wave with a triangular waveform at a specified fundamental frequency generated by the carrier wave oscillator 11 with the feedback information from the output voltage detecting circuit VS, and generates a signal for regulating the ON width of the switching element Q. The output signal from the comparator 12 is given to the gate of the switching element Q through a gate driving circuit 13 to perform the switching drive of the switching element Q. Thus, the switching element Q is ON/OFF-driven with the ON width corresponding to the feedback information FB under the fundamental frequency of the switching frequency fs.

The carrier wave oscillator 11 comprises a frequency controller that changes the fundamental frequency corresponding to a feedback voltage $V_{FB}$ proportional to the voltage difference between the feedback information that is the output voltage Vout and a reference voltage Vref. The carrier wave oscillator 11 receives the feedback voltage $V_{FB}$ that varies with the load condition and gives information about the magnitude of the load. The carrier wave oscillator 11 reduces the fundamental frequency of the switching frequency fs in a light load period based on the information. Thus, the carrier wave oscillator 11 prevents efficiency decrease in the main body SW of the switching power supply.

The sweeping circuit 14 generates a frequency control signal with a triangular waveform, for example, to give a frequency change a spread width $\pm\Delta f$ to the fundamental frequency in synchronism with the carrier wave of triangular waveform at the fundamental frequency generated by the carrier wave oscillator 11. The carrier wave oscillator 11 receives the frequency control signal generated by the sweeping circuit 14 and modulates the carrier wave of the fundamental frequency according the frequency control signal in the range of the frequency spread width $\pm\Delta f$.

As a consequence, the switching frequency fs of the switching element Q regulated by the carrier wave oscillator 11 becomes fs$\pm\Delta f$. The switching frequencies fs are modulated frequencies in the range of the frequency spread width $\pm\Delta f$ from the fundamental frequency. Thus, the carrier wave with a triangular waveform given to the comparator 12 is modulated to fs$\pm\Delta f$, and the switching frequency fs of the switching element Q is accordingly modulated with the frequency spread width $\pm\Delta f$.

The control circuit CONT comprises a frequency detecting circuit 15 that detects the switching frequency fs of the switching element Q from a current detecting signal CS proportional to the current running through the switching element Q, and obtains the fundamental frequency. A frequency skipping control circuit 16 compares the fundamental frequency of the switching frequency fs detected by the frequency detecting circuit 15 with the threshold frequencies fth preset in the threshold value memory 17, and according to the comparison result, the frequency skipping control circuit 16 controls the carrier wave oscillator 11 or the sweeping circuit 14.

The threshold frequencies fth preset in the threshold value memory 17 are determined, for example, as 50 kHz, 38 kHz, 30 kHz, and 25 kHz in the case of the switching power supply, mentioned previously, that performs switching operation at a switching frequency fs of 65 kHz under the condition of the load Po of 100% and that performs frequency spread control with a frequency spread width $\pm\Delta f$ of $\pm 7\%$ of the switching frequency fs.

These threshold frequencies fth are the fundamental frequencies corresponding to the orders n of harmonics generating conduction noise of the harmonics that changes the frequency thereof between above and below 150 kHz caused by the frequency spread control of the switching frequency fs. The threshold frequencies fth are preliminarily obtained by calculation according to the relationship between the switching frequency fs and the frequency of conduction noise of harmonics.

When the fundamental frequency becomes the threshold frequency fth in the reducing control of the switching frequency fs, the frequency skipping control circuit 16 controls the carrier wave oscillator 11 to skip the fundamental frequency by a predetermined frequency. Specifically, the feedback voltage $V_{FB}$ is shifted by a predetermined voltage so that the fundamental frequency of the carrier wave generated by the carrier wave oscillator 11 is skipped by a predetermined frequency. The width of skip of frequency is determined as the frequency spread width $\pm\Delta f$ to the fundamental frequency. The skip of the fundamental frequency of the carrier wave causes change of the frequency spread width $\pm\Delta f$.

Alternatively, the frequency skipping control circuit 16 controls the sweeping circuit 14 when the fundamental frequency becomes the threshold frequency fth in the reducing control of the switching frequency fs. The frequency skip control circuit 16 shifts the voltage of the frequency control signal with a triangular waveform for performing center spread in which the fundamental frequency of the carrier wave is changed in the frequency range of $\pm\Delta f$, and performs down spreading in which the frequency control signal is changed to a voltage for varying the fundamental frequency in the frequency range of −2Δf to zero.

Because the fundamental frequency of the carrier wave is not skipped in this case, the frequency spread width ±Δf does not change as well. Solely the center frequency, which is the fundamental frequency of the switching frequency fs, changes. Thus, the control on the sweeping circuit 14 also changes the center frequency, which is a fundamental frequency, of the switching frequency fs and consequently has virtually the equivalent effect to the control on the carrier wave oscillator 11.

Figure 2:
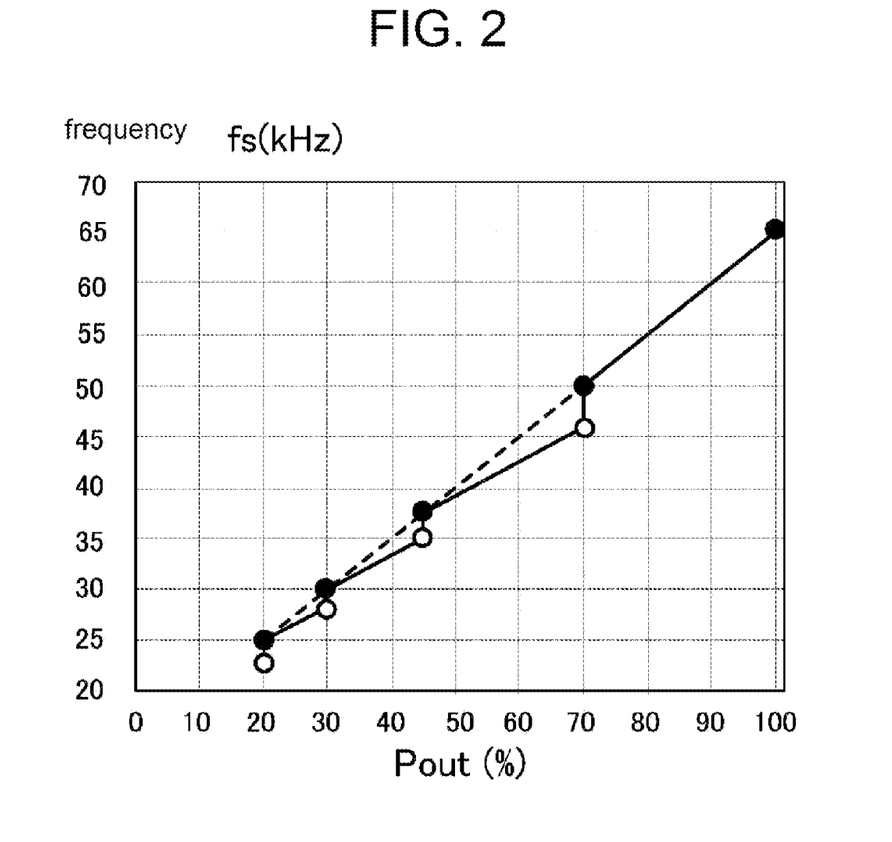
FIG. 2 shows relationship between the load Pout and the switching frequency fs in the switching power supply having the control circuit of FIG. 1.

In the control circuit CONT provided with the frequency skip control circuit 16, as shown in FIG. 2 by the relationship between the load Pout and the switching frequency fs designated with the solid line, the switching frequency fs is skipped to 46 kHz when the switching frequency fs is lowered to 50 kHz through the reducing control of the switching frequency fs corresponding to the load. Similarly, the switching frequency fs is skipped to 35 kHz when it is lowered to 38 kHz; the switching frequency fs is skipped to 28 kHz when it is lowered to 30 kHz; and the switching frequency fs is skipped to 23 kHz when it is lowered to 25 kHz.

Figure 3:
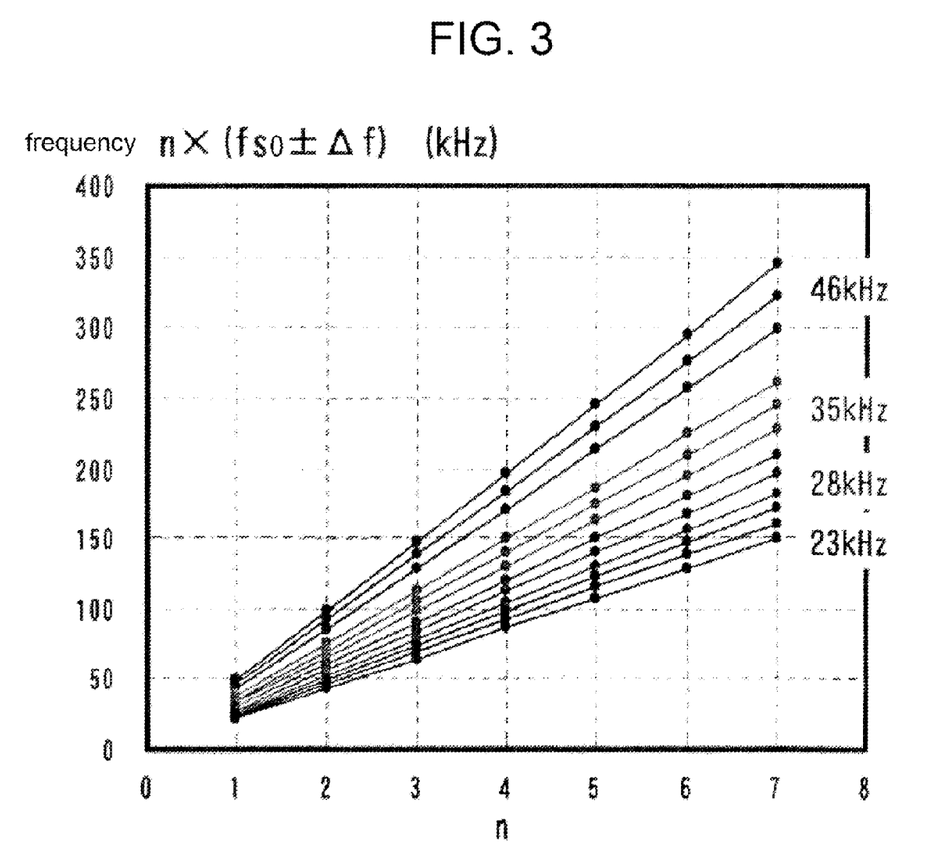
FIG. 3 shows the frequencies of conduction noise corresponding to an order n of harmonics at the switching frequencies fs of 46 kHz, 35 kHz, 28 kHz, and 23 kHz including a frequency spread width Δf.

FIG. 3 shows the frequencies of conduction noise corresponding to an order n of harmonics in the switching frequencies fs of 46 kHz, 35 kHz, 28 kHz, and 23 kHz. It is apparent that the frequency component just above the 150 kHz, which was significant in the conventional system, has disappeared. Thus, even though the frequency spreading control is conducted simultaneously with the reducing control of the switching frequency fs corresponding to the load condition, the control circuit CONT of the invention suppresses generation of conduction noise of harmonics around 150 kHz due to the modulation width ±Δf of the switching frequency fs. Therefore, the conduction noise in the frequency band higher than 150 kHz is stably reduced.

Figure 4:
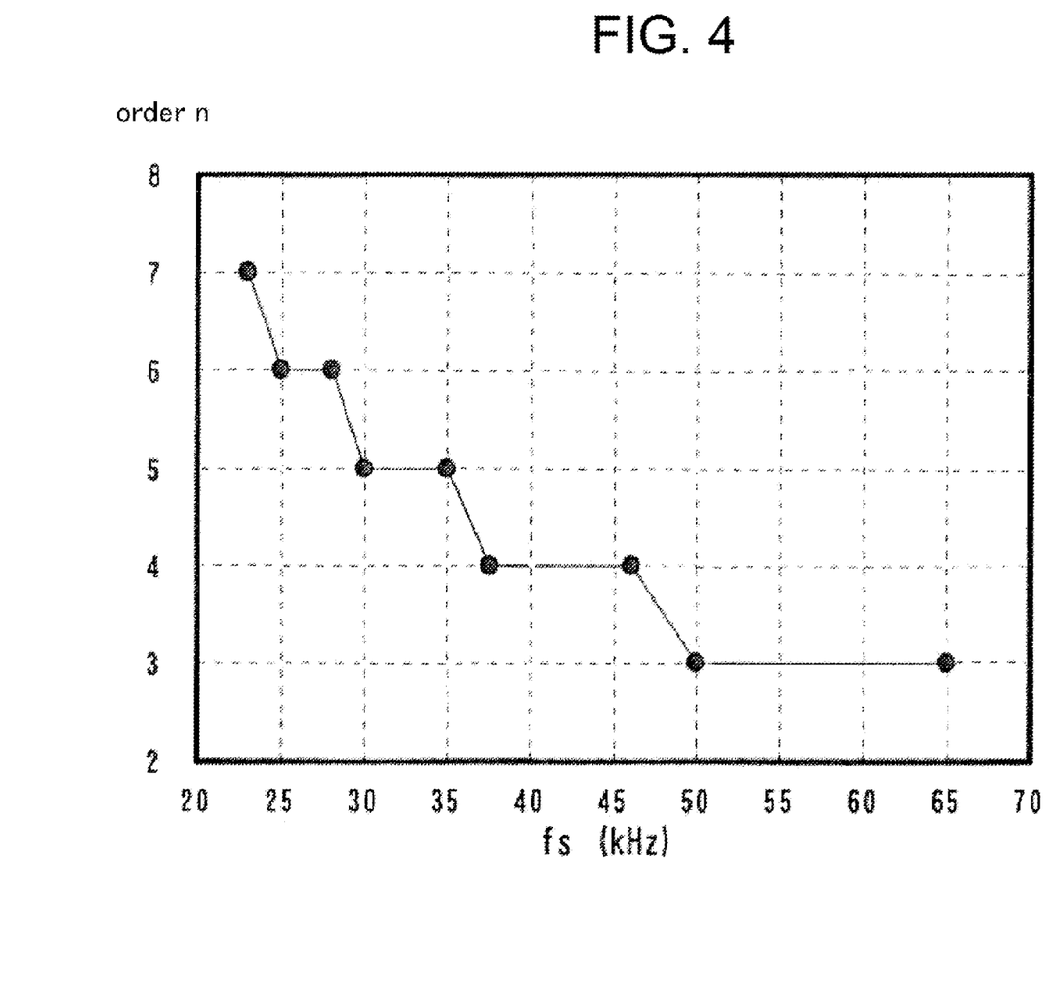
FIG. 4 shows the order n of harmonics that generate conduction noise of the harmonics at around 150 kHz as a function of a switching frequency fs in the switching power supply having the control circuit of FIG. 1.

FIG. 4 shows a relationship, in measuring conduction noise at around 150 kHz and above, between change of the switching frequency fs and the order n of harmonics that causes conduction noise of harmonics around 150 kHz that appear with the reducing control of the switching frequency fs. In a switching power supply according to the embodiment of the invention, when the switching frequency fs becomes a frequency at which conduction noise of harmonics around 150 kHz is generated, the switching frequency fs is skipped by a predetermined frequency, thereby avoiding the vicinity of 150 kHz and leading to generation of harmonic noise of an order n of one order higher as shown in FIG. 4.

As is clearly shown from comparison with the previously mentioned characteristics of FIG. 8, avoiding driving at the switching frequency fs of changeover point of the order n of harmonics that causes generation of conduction noise around 150 kHz, the reducing control of the switching frequency fs corresponding to the load is conducted simultaneously with the reducing control of noise owing to the frequency spread, and thus, the conduction noise is stably reduced. Moreover, this effective reduction of conduction noise has been achieved over the entire control range of the switching frequency fs by the simple control that the fundamental frequency is skipped at the specific switching frequency fs.

The present invention is not limited to the embodiment described thus far. For example, the frequency of the skip control point for the fundamental frequency and the skipping frequency can be determined corresponding to the switching frequency fs and the frequency spread width ±Δf by preliminary calculation. Although the power supply of the embodiment detects the switching frequency fs from the signal CS obtained by detecting the current through the switching element Q, the switching frequency fs can of course be detected from the carrier wave delivered by the carrier wave oscillator 11. The present invention can be varied or modified without deviating from the spirit and scope of the invention.

DESCRIPTION OF SYMBOLS

SW: main body of the switching power supply
Q: switching element
CONT: control circuit that is a control IC
VS: output voltage detecting circuit
11: carrier wave oscillator
12: comparator
13: gate driving circuit
14: sweeping circuit
15: frequency detecting circuit
16: frequency skip control circuit
17: threshold value memory

What is claimed is:

1. A switching power supply comprising:
   a main body of the switching power supply that switches an input voltage by a switching element and delivers a specified output voltage;
   a control circuit that ON/OFF-drives the switching element at a predetermined frequency;
   a frequency controller that controls the switching frequency of the switching element corresponding to a load condition of the main body of the switching power supply and reduces the switching frequency in a light load period;
   a frequency spread modulator that modulates the switching frequency with a frequency spread width corresponding to the switching frequency; and
   a frequency skipping controller that controls the frequency controller to skip a fundamental frequency of the switching frequency when the fundamental frequency of the switching frequency becomes a predetermined threshold frequency.

2. The switching power supply according to claim 1, wherein the frequency skipping controller controls skipping of the fundamental frequency with a threshold frequency that is a fundamental frequency of the switching frequency at which an order of harmonics at a specified frequency changes in conduction noise generated due to switching of the switching element.

3. The switching power supply according to claim 1, wherein the frequency skipping controller detects the switching frequency of the switching element from change of current through the switching element and compares the fundamental frequency of the switching frequency with the threshold frequency to control skipping of the fundamental frequency.

4. The switching power supply according to claim 1, wherein the predetermined threshold frequency is one of threshold frequencies that are preliminarily set for fundamental frequencies of the switching frequency at which a frequency of conduction noise of harmonics generated corresponding to frequency-modulated switching frequency changes between above and below 150 kHz.

5. An apparatus, comprising:
   a frequency control device configured to control a switching frequency of a switching power supply;
   a frequency adjustment device configured to, during a period of switching frequency reduction based on a predetermined load condition of the switching power supply, control the frequency control device based on a fundamental frequency of the switching frequency, by setting the switching frequency to value offset by a predetermined amount from a fundamental frequency of the switching frequency;
a threshold value memory storing a plurality of threshold values respectively corresponding to a plurality of fundamental frequencies of the switching frequency; and
a detector configured to detect the switching frequency;
wherein the frequency adjustment device is configured to perform a comparison of the switching frequency detected by the detector with at least one of the plurality of threshold values and, based on a result of the comparison, set the switching frequency to the value offset by the predetermined amount from the at least one of the plurality of threshold values; and
wherein the plurality of fundamental frequencies correspond to a frequency of conduction noise of harmonics generated in response to changed in the switching frequency within a predetermined range of frequencies.

\* \* \* \* \*